Figures 1, 2:
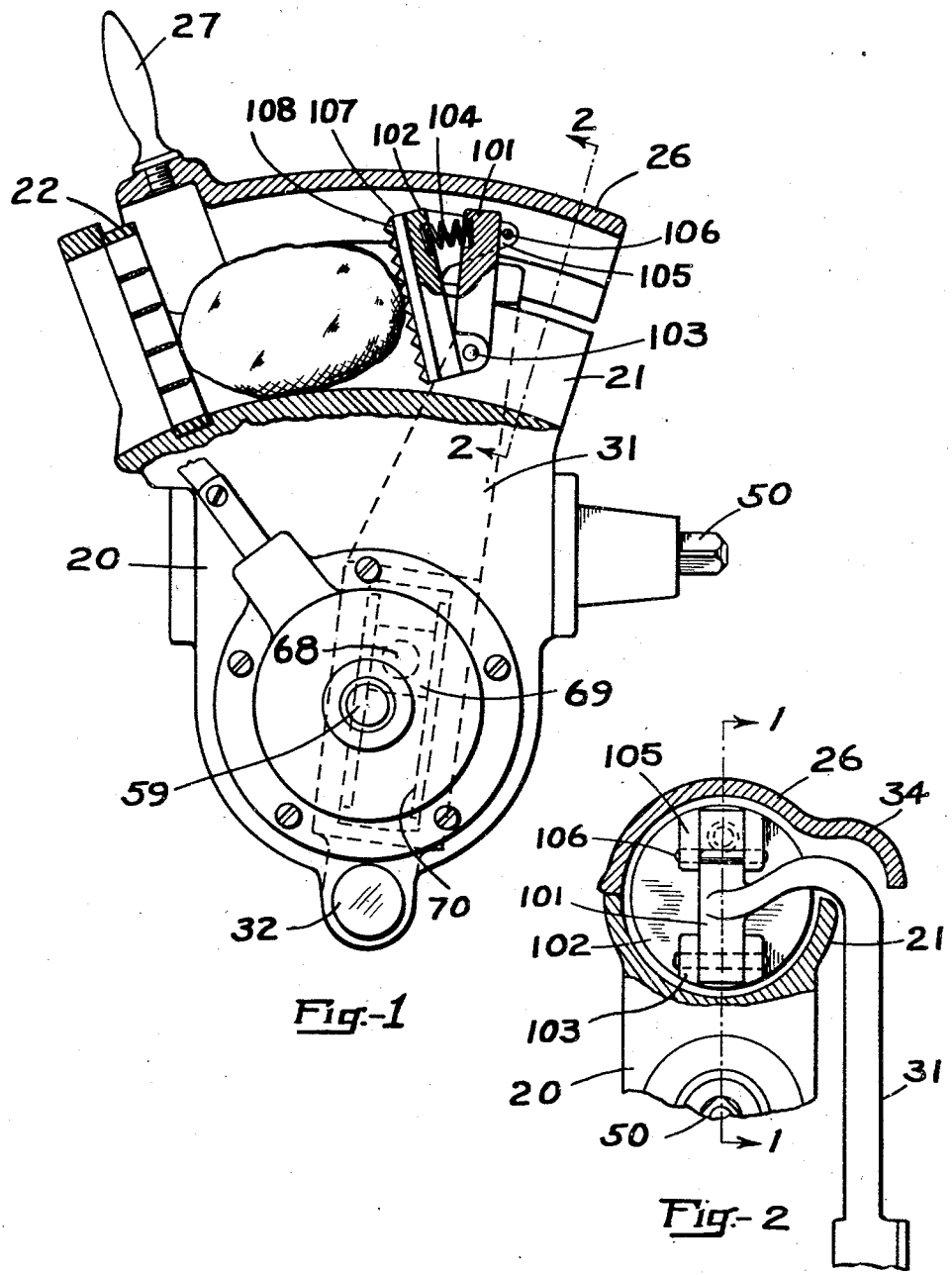

May 15, 1928. 1,670,261

H. L. JOHNSTON

APPARATUS FOR CUTTING FOODSTUFFS

Filed July 31, 1924

INVENTOR.
Herbert L. Johnston
BY
Marechal & Fehr
ATTORNEYS.

Patented May 15, 1928.

1,670,261

UNITED STATES PATENT OFFICE.

HERBERT L. JOHNSTON, OF TROY, OHIO, ASSIGNOR TO THE HOBART MANUFACTURING CO., OF TROY, OHIO, A CORPORATION OF OHIO.

APPARATUS FOR CUTTING FOODSTUFFS.

Application filed July 31, 1924. Serial No. 729,284.

The present invention relates to apparatus for cutting food stuffs.

One of the principal objects of the invention is to provide such an apparatus as a potato slicer, or the like, having a novel construction, combination and arrangement of parts or elements therein, which will be simple, reliable and safe in operation, and which may be conveniently and economically manufactured.

Further objects and advantages of the present invention will be apparent from the following description taken in connection with the accompanying drawings in which Fig. 1 is a side elevation of the invention, parts thereof being taken in section on the line 1—1 of Fig. 2; and Fig. 2 is a fragmentary sectional view taken on the line 2—2 of Fig. 1.

The present invention is an improvement on the invention disclosed in the prior application of Herbert L. Johnston, Serial No. 719,804, filed June 13, 1924, and is herein shown as embodied in a machine for cutting potatoes; although it will be understood that the present invention is susceptible of other applications and is not confined to the particular application herein illustrated.

Referring to the drawings, 20 designates a gear case or housing upon which is supported a curved trough 21 which is adapted to receive therein potatoes or other form of food stuffs to be cut. To permit of the ready insertion of food stuffs, the trough is provided with a movable cover portion 26 which is preferably pivotally connected with the trough 21 and is adapted to be raised by means of the handle 27.

Crank arm 31 is pivotally supported from the lower part of the gear case 20 by means of the pin 32 and extends upwardly alongside the gear case 20 and trough 21. Extending from the gear case 20 and suitably mounted therein is a rotary drive shaft 50, the extending portion of which is adapted to receive a crank or to be connected with any desired source of power. A driving connection is provided between the crank arm 31 and the drive shaft 50 whereby upon rotation of the drive shaft 50 the crank arm 31 is given a to and fro movement about the pin 32. Such driving connection may be of any suitable or desired form, but as herein illustrated, it includes a crank shaft 59 having a crank pin 68 cooperating with the sliding block 69 which is slidably mounted in the yoke 70 formed in the crank arm 31. By this mechanism rotation of the drive shaft 50 causes oscillation of the crank arm 31 from a position opposite one end of the trough 21 to a position opposite the other end of the trough.

The upper end of the crank arm 31 is bent laterally to project into the trough 21 through a slot at one side thereof and carries a pusher support 101, the top 26 being provided with an extended portion 34 overhanging the upper end of the crank arm as a protective covering therefor. A pusher member 102 is pivotally supported upon the pusher support by means of the pin 103 which passes through suitable lugs extending rearwardly from the pusher member adjacent its lower edge. The pusher member 102 is free to swing forwardly and backwardly about the pin 103 and is normally held in a forward or inclined position with respect to the pusher support 101 by means of a coiled spring or other yielding means 104 interposed between the members 101 and 102. Lugs 105 extending rearwardly from the upper portion of the pusher member and connected by a pin 106 form a yoke to limit the forward movement of the pusher member 102 about its pivot 103.

Within the trough 21 and preferably removably supported therein is a grid-like cutting member 22 having a plurality of cutting blades, the cutting edges of which blades face towards the pusher member, that is, towards the right as shown in Fig. 1. Upon a forward oscillation or movement of the pusher member 102 towards the cutting member 22, it will be apparent that the potato or other food stuffs interposed between the cutter member 22 and the pusher member 102 will be pushed through the cutter member and thus cut into the desired form. Referring to Fig. 1, it will be observed that the pusher member 102 is disposed substantially at right angles or normal to the line of pressure or thrust between the pusher member and the cutter member, that is, the pusher member is disposed approximately parallel to the cutter member. By this construction any tendency of the potato to slide with reference to the surface of the pusher member is largely obviated, and further, the pressure exerted upon the potato by the pusher member is approximately normal to the plane of cutter member 22. As the crank arm 31 approaches the cutter member 22 the angle of the line of pressure through the potato varies so that the pusher member 102 is moved backwardly and the spring 104 is compressed, thus maintaining the surface of the pusher member approximately normal to the line of pressure as the pusher member approaches the cutter member 22.

The surface of the pusher member is preferably faced with rubber 107 or other yieldable material provided with suitable gripping projections or means 108 for preventing movement of the food stuffs with respect to the surface of the pusher member. In the extreme forward position of the pusher member, the rubber facing 107 is pressed against the cutting edges of the blades so that portions of the rubber facing project between the blades, thus insuring complete cutting of the potato by the cutter member. While the pusher member is herein described as having a facing of yieldable material for receiving the cutting edges of the blades therein, it will be understood that the invention is not limited to the use of a yieldable material but may include any material or formation of the surface of the pusher member which will receive the cutting edges of the blades so that portions of the pusher surface may extend between the blades to insure complete cutting of the food stuffs.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an apparatus of the character described, a trough adapted to receive food stuffs, a cutting member, a pusher member mounted to move out of contact with the trough for pushing the food stuffs toward the cutting member, and means tending to hold the face of the pusher member normal to the line of pressure during the movement of the pusher member toward the cutting member.

2. In an apparatus of the character described, a trough adapted to receive food stuffs, a cutting member, an actuating member, a pusher member pivotally connected adjacent its lower side to said actuating member and mounted for movement out of contact with said trough, and yielding means interposed between the pivoted pusher member and the supporting actuating member.

3. In an apparatus of the character described, a trough adapted to receive food stuffs, a cutting member, a pusher member for pushing the food stuffs toward the cutting member, an actuating member terminating within the trough, and means for pivotally and yieldably connecting the pusher member with the actuating member.

4. In an apparatus of the character described, a trough adapted to receive food stuffs, a cutting member, an actuating member, a pusher member pivotally connected adjacent its lower side to said actuating member and mounted for movement out of contact with said trough, yielding means interposed between the pivoted pusher member and the supporting actuating member, and means for limiting the movement of the pivoted pusher member with respect to its supporting actuating member.

5. In an apparatus of the character described, a curved trough adapted to receive food stuffs therein, a cutting member, a pusher member for pushing the food stuffs toward the cutting member, and means tending to hold the face of the pusher member normal to the line of pressure during the movement of the pusher member toward the cutting member.

6. In an apparatus of the character described, a curved trough adapted to receive food stuffs therein, a cutting member, a pusher member for pushing the food stuffs toward the cutting member, and yielding means tending to hold the face of the pusher member normal to the line of pressure during the movement of the pusher member toward the cutting member.

7. In an apparatus of the character described, a curved trough adapted to receive food stuffs therein, a cutting member, a pusher member for pushing the food stuffs toward the cutting member, and means for supporting the pusher member for swinging movement about an axis transverse to the direction of movement of the pusher member.

8. In an apparatus of the character described, a curved trough adapted to receive food stuffs therein, a cutting member, a pusher member for pushing the food stuffs toward the cutting member, an actuating member pivoted for swinging movement about its lower end, and means for pivotally connecting the pusher member with the upper end of the actuating member.

9. In an apparatus of the character described, a curved trough adapted to receive food stuffs therein, a cutting member, a pusher member for pushing the food stuffs toward the cutting member, an actuating member pivoted for swinging movement about its lower end, means for pivotally connecting the pusher member with the upper end of the actuating member, and means carried by said members for yieldingly holding the pusher member in an inclined position with respect to the actuating member.

In testimony whereof I hereto affix my signature.

HERBERT L. JOHNSTON.